United States Patent Office 2,949,245
Patented Aug. 16, 1960

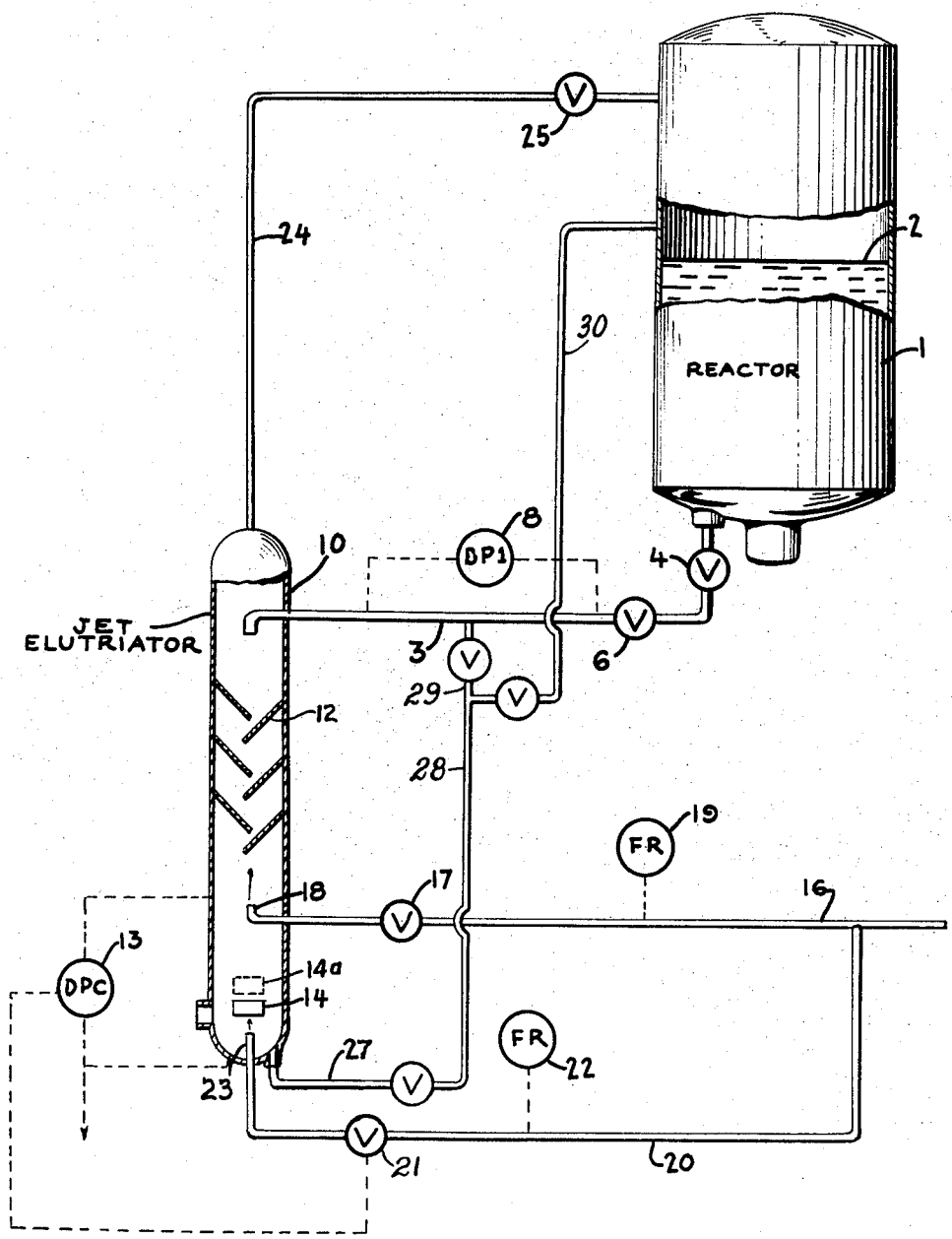

2,949,245

ELUTRIATION OF SOLIDS

Kenneth H. Faulk, Lake Charles, La., assignor to Cities Service Refining Corporation, Lake Charles, La., a corporation of Delaware Filed Mar. 19, 1957, Ser. No. 647,136

4 Claims. (Cl. 241—5)

This invention relates to a method of separating finely divided solid particles. More particularly, it relates to new and useful improvements in apparatus for and methods of controlling particle size in a fluidized reaction system.

In a conventional fluidized system such as is used in catalytic cracking and catalytic reforming processes, the fluidized bed of catalyst maintained in the reaction vessel provides an ideal means for effecting maximum contact between catalyst particles and reactant vapors. This contact results in the production of desired products and the simultaneous laydown of coke on the catalyst particles.

The efficiency of the reaction resulting from the contact of the catalyst particles and reaction vapors depends on several factors including the nature of the feed, contact time, temperature, pressure, catalyst activity and efficiency and bed density. It is with these latter factors of reaction efficiency and bed density that this invention is particularly concerned. It has been found that maximum efficiency in a fluidized bed is obtained when an average mean density for the bed is maintained.

This is somewhat difficult, in view of the attrition resulting in the production of fines, which are normally lost, and the increase in attrition resistance with age of the catalyst. These factors result in a gradual increase in the concentration of the larger attrition resistant catalyst particles at the expense of the more fragile fresh catalyst additions. In situations where the catalyst bed includes a high percentage of catalyst particles having a larger diameter than that of the average mean diameter desired, steps must be taken to remove such larger particles from the system. In some situations steps must also be taken to remove the catalyst fines or dust particles from the system.

Several means have been proposed for accomplishing the removal of fines. For example, U.S. 2,704,154 discloses a baffled elutriator for removing coarse catalyst particles from the system. In a similar manner, U.S. 2,683,685 discloses a process for accomplishing sharp separations of finely divided powders at velocities considerably higher than the terminal velocities of the particles. In U.S. 2,754,966, an improved apparatus for the elutriation of fines is disclosed.

While the foregoing methods provide a means for removing particles of undesirable size from a fluidized system, no apparatus or method is presently available by which such separation can be effected while simultaneously providing specific control and adjustment of the size of the particles without loss of the same.

It is accordingly an object of the present invention to provide an improved apparatus for elutriating finely divided solids.

It is a further object of the present invention to maintain and increase the quantity of desired average size particles at the expense of undesirable, larger size particles in a fluidized system.

It is another object of the present invention to improve the characteristics of a fluidized bed by maintaining the bed at a substantially constant average density.

It is a further object of the present invention to provide an improved method of effecting fluidized reactions by controlling catalyst particle size with minimum catalyst loss and simultaneously reducing the amount of catalyst normally rejected from the system.

These and other objects and advantages obtainable according to the present invention will be more apparent from the description which follows.

In accordance with the present invention an improved elutriator is utilized comprising a cylindrical vessel having a plurality of baffles therein which permits catalyst to move downwardly in the vessel countercurrently to an upwardly flowing elutriating gas stream. This stream is introduced into the elutriator at a rate sufficient to remove desired size particles from the downwardly flowing catalyst mass. In the lower portion of the cylindrical vessel, particles of a size greater than the mean average size desired are accumulated. A high velocity jet of gas or air is passed into this accumulated mass of larger size particles so that a portion of the particles is entrained against a target plate positioned below the elutriation zone in the elutriator. Contact of the entrained catalyst stream with the target plate results in a reduction in the size of the larger particles. The particles of reduced diameter may be combined with the particles being removed during the passage through the baffles. The particles of desired size are returned to the reaction zone. Return of this catalyst stream having a size range within the desired range, improves bed efficiency, permits greater control of the reaction conditions, minimizes carbon laydown and generally provides a more efficient system.

The drawing associated herewith shows one form of the improved apparatus of the present invention as embodied in conventional fluidized system.

In the drawing, numeral 1 indicates a conventional reaction vessel normally associated with a fluidized catalytic cracking or hydroforming process. Numeral 2 identifies the level of the fluidized catalyst bed in the reaction vessel. That portion of the bed below the line indicated is generally identified or referred to as the dense phase reaction zone. Catalyst maintained in a fluidized state above the line 2 is generally referred to as the dilute phase from which reaction products are withdrawn from the reaction vessel by means not shown.

In the bottom of reactor 1, a catalyst withdrawal line 3 is provided, connecting the reaction vessel with elutriator 10. A catalyst control valve 6, as well as a catalyst shut-off valve 4, are provided in line 3 to control the rate at which catalyst is withdrawn from reactor 1. A catalyst flow differential pressure indicator 8 is provided in withdrawal line 3.

Elutriator 10 is a cylindrical vessel having in the intermediate portion thereof, a plurality of baffles 12 which, for the purposes of the present invention will be referred to as the elutriation zone. Baffles 12 are downwardly inclined, overlapped in fixed space relationship so as to provide a circuitous undulating path of catalyst flow in the elutriation zone. Catalyst withdrawal line 3 is designed and positioned to terminate just above the top baffle in the elutriation zone so that catalyst delivered thereto will be deposited on the top baffles of the elutriation zone.

In the lower portion of the elutriator and below the elutriation zone, elutriation gas inlet line 16 terminates in nozzle 18. The elutriation gas utilized in line 16 may be air or gas obtained from any suitable source such as a refinery recycle gas. Nozzle 18 is designed and positioned so that gas passing therethrough from line 16 will move upwardly through the baffles in countercurrent flow to the catalyst passing downwardly therein. Control of gas in line 16 is provided by elutriation gas control valve 17. A flow recorder 19 in line 16 indicates flow rate of the air or gas flowing therethrough.

Catalyst introduced in elutriator 10 by way of line 3 moves downwardly across the baffles 12. In this descent lighter or small catalyst particles will be carried upwardly by the elutriation gas for return to the reactor 1. This is accomplished by line 24.

In the bottom of the elutriation vessel, a target plate 14 is positioned below nozzle 18 and above nozzle 23. Nozzle 23 is positioned directly below the target plate 14 and aligned therewith so that larger size particles which have accumulated in the bottom of the vessel 10 will be entrained and carried upwardly to impinge against plate 14. Target plate 14 may be adjusted in height vertically within the lower portion of the elutriator vessel as indicated at 14a so that adjustment of the size of the particles produced by the impingement of the entrained gas stream against the lower side of the target plate can be obtained when gas is emitted from nozzle 23 at a fixed or constant rate.

The air or gas delivered to nozzle 23 by way of line 20 is controlled by a differential pressure controller 13 through a control valve 21. A flow recorder 22 in line 20 measures the flow of gas so that the total flow to the elutriator will be known and the flow through line 16 can be controlled by valve 17 to compensate for the flow through line 20 if desired. By these means the particle size of the catalyst flowing down through elutriating section, the level of the dense phase in the bottom section and the rate and degree of grinding are controlled.

When carrying out separation and control of particle size according to the present invention, a flow of gas or air is established through elutriator 10 by opening valve 17 in line 16. The flow rate through line 16, will, of course, be varied, depending on the size of the elutriator and the particle size separation desired therein. For example, when it is desired to increase the percentage of 20–80 micron particles in the catalyst bed so as to maintain the 80+ micron size particles below 10 weight percent of the total catalyst bed, gas flow through the elutriator will be approximately 10 to 20 feet per second, in an elutriator having a diameter of about 12 inches. If the elutriator is of a larger or smaller diameter, the elutriation gas rate will be adjusted accordingly. After the gas flow through the elutriation zone is established, catalyst flow to the elutriation zone is initiated by opening valve 4 and partially opening valve 6. The catalyst withdrawn at a substantially continuous rate from the reactor will be a representative portion of the reactor catalyst bed. While the operation contemplated will be conducted in a continuous manner, if desired the elutriator may be operated on a batch cycle. Differential pressure indicator 8 provides an indication of the relative amount of catalyst flowing in line 3. If desired, other means for controlling or measuring quantitatively, the flow of catalyst in line 3 may be used.

Catalyst withdrawn from the reactor 1 by way of line 3 is delivered to the elutriator zone as shown in the drawing at a point above the top baffle of elutriation zone 12. Under the conditions described, the entire catalyst flow will now be returned to the reactor by way of catalyst return line 24.

As soon as catalyst flow is established, the flow in line 16 is reduced by closing valve 17. Flow in line 16 is reduced until the differential pressure between the taps to the differential pressure controller 13 reach a predetermined setting at which time, valve 21 will be opened.

Flow of gas through line 20 to nozzle 23 is observed at the flow recorder 22. Control of gas flow in line 20 is obtained by varying the flow in line 16 or by adjusting the setting on the differential pressure controller 13 in accordance with the size reduction of catalyst desired.

Normally, the flow of gas in lines 16 and 20 will be balanced so that the larger size catalyst particles separated during the down catalyst downward passage through the baffles above nozzle 18 will drop to the bottom of the elutriator and therein be entrained on the gas jet provided or emitted from nozzle 23. Entrainment of the larger size catalyst particles accumulated in the bottom of the elutriator 10 by means of the high velocity stream emitted from nozzle 23 directs the same against the bottom of target plate 14 at a sufficient velocity to cause a grinding or reduction in the size of the large particles. In addition to the contact of the catalyst particles with the target plate, there is considerable grinding effect obtained by the contact of catalyst particles with each other during contact with the plate. The degree of reduction accomplished in catalyst particle size will depend on the velocity of the gas emitted from nozzle 23 and the distance of the target plate 14 from the nozzle.

When the gas emitted from the nozzle 23 has a constant velocity, control of catalyst particle size may be accomplished by vertically adjusting the position of the target plate 14. As the plate is moved closer to the nozzle, a higher degree of breaking of particles will occur than if the target plate is at maximum height from nozzle 23.

When the target plate 14 is maintained at a fixed height above the nozzle 23, variation in catalyst size can be obtained by increasing or decreasing the flow rate of gas in line 20. This gas flow is controlled by valve 21. When a substantial decrease in catalyst size is contemplated gas flow in line 20 will be increased, thus providing a high velocity jet for impingement of the larger size particles against the target plate 14. Conversely, when a smaller reduction in particle size is desired, velocity of the gas emitted from nozzle 23 is reduced. Generally speaking, the flow rate through nozzle 23 will be varied between about 50 and 1000 feet per second, depending on the particle size desired.

Particles of reduced size resulting from contact with the target plate are included in the dense catalyst phase. The normal turbulence of the dense phase fluidized catalyst will then carry them to the upper portion of the dense phase where they are entrained by the gas stream emitted from nozzle 18 and returned to the reactor 1 by way of line 24.

In normal operation, the nozzle 23 is operated substantially continuously until the catalyst in the bed of reactor 1 has reached the desired range of particle sizes. The downwardly moving catalyst particles are controlled to establish a dense phase level in the bottom section of the elutriator. The target plate 14 and nozzle 23 are immersed in the dense phase catalyst. The elutriating nozzle 18 is also immersed but due to its relatively large gas flow it establishes an intermediate phase above it which diminishes in density to the dilute phase. The particles of reduced size resulting from contact with the target plate are separated from the larger particles in the intermediate and dilute phases and are then carried up through the elutriation section to the reactor 1 by way of line 24. Alternatively, a mixture containing the smaller particles resulting from the grinding and the larger particles could be withdrawn by way of line 27 to maintain the desired catalyst level rather than being carried back up through the elutriator as described above. The mixture so withdrawn could be returned to the reactor 1 by catalyst transfer lines 28 and 30 or to the elutriator above the baffles by catalyst transfer lines 28 and 29.

According to the method of the present invention, it is possible to increase the percentage of the 20–80 micron particles in the catalyst bed by reducing the size of the 80+ micron particles so that they constitute less than 10 weight percent of the total catalyst volume.

Carrying out the elutriation and grinding of the larger size particles according to the method described above provides many advantages in the operation of the fluidized system described. Specifically, the maintenance of a catalyst bed having a higher percentage of smaller particles increases reaction efficiency. Additional control of particle size in the manner described improves the coke burning characteristics of the catalyst. Furthermore, elutriation of catalyst according to the present invention, reduces catalyst loss and minimizes the amount of catalyst rejection normally required in the fluidized system.

While the present invention has generally been described with reference to a fluid catalytic cracking or fluid hydroforming system, the principles of this invention may be applied to any fluidized system wherein control and reduction to maintain average bed size of particles is desired.

It is quite apparent that other embodiments of this invention may be made without departing from the scope thereof. It is to be understood that the matter set forth herein and shown in the accompanying drawing is to be considered illustrative and not in any way a limitation of the invention.

What is claimed as new is:

1. A method of controlling catalyst particle size in a fluidized system to maintain therein a predetermined catalyst particle size range which comprises continuously withdrawing a representative portion of catalyst particles from a fluidized reaction zone, said representative portion including catalyst particles of a size greater than the desired size range, introducing said representative portion into an elutriation column, passing a gas stream upwardly through said representative portion, said gas stream being passed at a rate sufficient to separate from the representative portion particles having a size within the desired particle size range, allowing the remaining particles to fall by gravity into an accumulation zone, passing a second gas stream through the accumulated particles, said gas stream being of a velocity sufficient to aid in the reduction in size of the particles and to separate from the particles reduced in size those having a size within the desired range, reducing the remaining accumulated particles to a size within the desired range, and combining the catalyst first separated with catalyst of the desired particle size obtained by reduction in size and returning the combined catalyst to the fluidized reaction zone.

2. A method of controlling catalyst particle size and distribution in a fluidized system so as to maintain within the reaction zone of such a system a predetermined catalyst particle size range which comprises continuously withdrawing a representative portion of catalyst particles from the reaction zone, said representative portion including catalyst particles having a size greater than the desired size range, introducing said representative portion into an elutriation zone, passing a gas stream upwardly through said portion at a rate sufficient to separate from a downwardly flowing portion catalyst particles having the desired particle size range, permitting catalyst not removed from the representative portion to accumulate, passing a second gas stream through the accumulated catalyst particles, said gas stream being passed at a rate sufficient to separate from the representative portion particles having a size within the desired particle size range, said second gas stream being of a velocity sufficient to aid in the reduction of the particles and to separate from the particles reduced in size those having a size within the desired range, reducing a portion of the accumulated particles to a size within the desired range, controlling the level of the accumulated catalyst particles by withdrawing a portion of said accumulated catalyst, and combining the catalyst first separated with catalyst of the desired particle size obtained by reduction in size and returning the combined catalyst to the fluidized reaction zone.

3. An apparatus for controlling the size and particle distribution in a fluidized catalytic system comprising a cylindrical casing, a catalyst removal line in the top of said casing, an elutriation zone in an intermediate portion of said casing, said elutriation zone comprising a plurality of downwardly inclined baffles fixedly positioned in overlapping spaced relationship, a catalyst delivery line in said casing terminating above the top baffle in the elutriation zone, an elutriation gas inlet below said baffles, said elutriation gas inlet being provided with a nozzle adapted to direct the flow of elutriation gas upwardly through said baffles, a target plate in the lower portion of said casing positioned below the elutriation gas inlet, said target plate having a diameter less than the diameter of the cylindrical casing, said plate being horizontally positioned within the casing and vertically adjustable, a gas entraining line in the lower portion of said casing below said target plate, said gas entraining line terminating in a nozzle adapted to direct the flow of entraining gas against the lower face of said target plate, control means associated with said entraining gas line to adjust the flow rate thereof in accordance with the desired range of particle size to be withdrawn from the top of the elutriator when maintaining the target plate at a fixed height from the entraining gas nozzle, a draw off line in the bottom of said cylindrical casing, and return means associated with the bottom draw off line to return withdrawn catalyst to the reactor.

4. An apparatus for controlling the size and particle distribution in a fluidized catalytic system comprising a cylindrical casing, a catalyst removal line in the top of said casing, an elutriation zone in an intermediate portion of said casing, said elutriation zone comprising a plurality of downwardly inclined baffles fixedly positioned in overlapping spaced relationship, a catalyst delivery line in said casing terminating above the top baffle in the elutriation zone, an elutriation gas inlet below said baffles, said elutriation gas inlet being provided with a nozzle adapted to direct the flow of elutriation gas upwardly through said baffles, a target plate in the lower portion of said casing positioned below the elutriation gas inlet, said target plate having a diameter less than the diameter of the cylindrical casing, said plate being horizontally positioned within the casing and vertically adjustable, a gas entraining line in the lower portion of said casing below said target plate, said gas entraining line terminating in a nozzle adapted to direct the flow of entraining gas against the lower face of said target plate, control means associated with said entraining gas line to adjust the flow rate thereof in accordance with the desired range of particle size to be withdrawn from the top of the elutriator when maintaining the target plate at a fixed height from the entraining gas nozzle, a draw off line in the bottom of said cylindrical casing, and means connected to the bottom draw off line for returning withdrawn catalyst to the elutriator above the elutriation zone.

References Cited in the file of this patent

UNITED STATES PATENTS

| 248,528 | Taggart | Oct. 18, 1881 |
| 2,487,088 | Andrews | Nov. 8, 1949 |
| 2,494,153 | Andrews et al. | Jan. 10, 1950 |

FOREIGN PATENTS

| 701,231 | Great Britain | Dec. 23, 1953 |